H. C. JARVIS.
BRAKE OPERATING MEANS FOR TRAILERS.
APPLICATION FILED MAY 23, 1918.
1,336,235.
Patented Apr. 6, 1920.
2 SHEETS—SHEET 2.
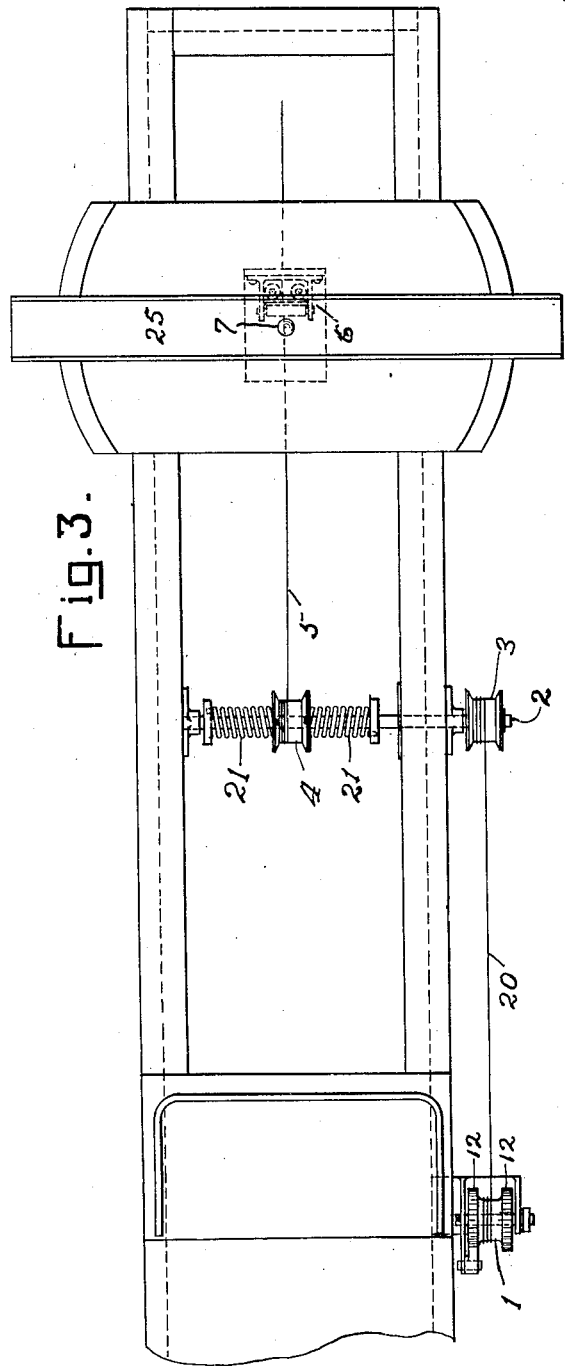
Inventor
Herbert C. Jarvis.
By Henry L. Reynolds,
Attorney

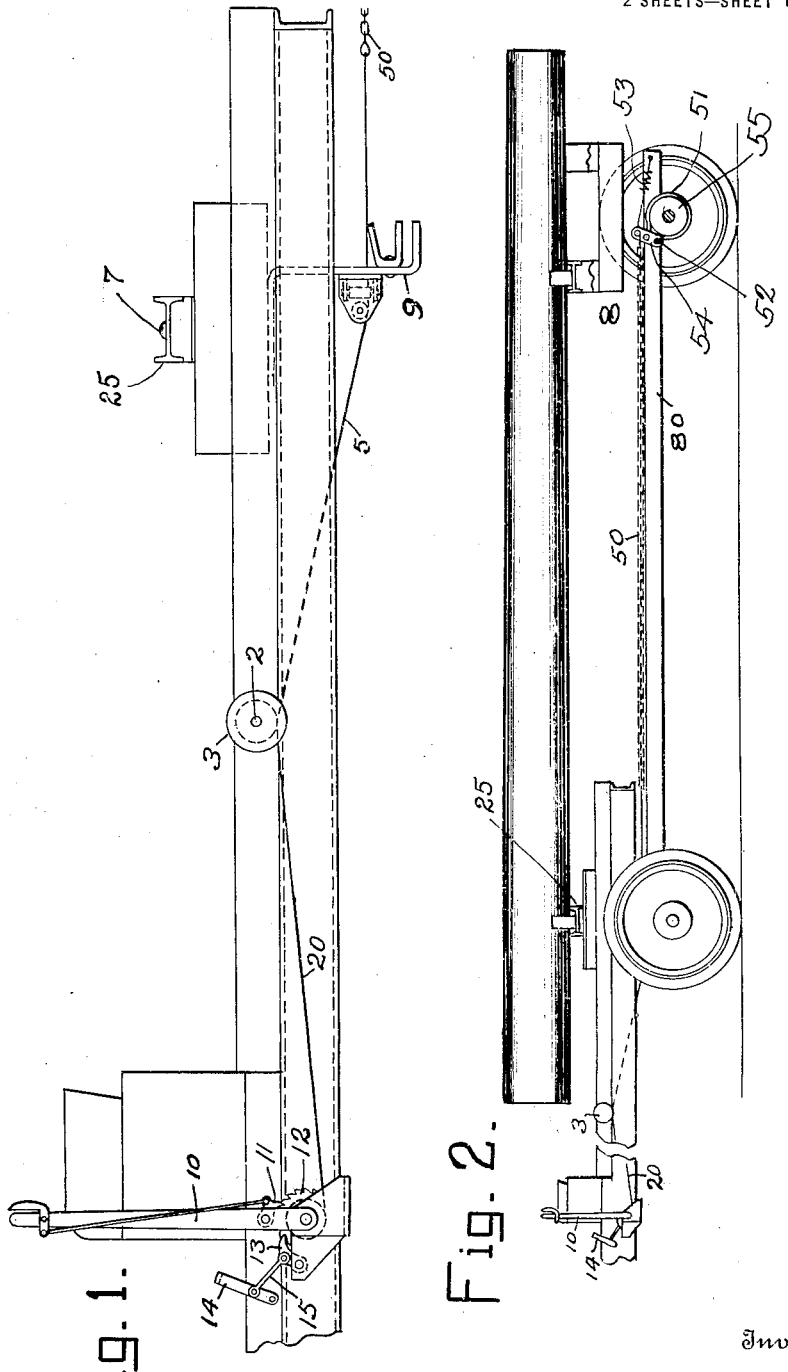

UNITED STATES PATENT OFFICE.

HERBERT C. JARVIS, OF RENTON, WASHINGTON, ASSIGNOR TO PACIFIC CAR & FOUNDRY CO., OF SEATTLE, WASHINGTON, A CORPORATION OF WASHINGTON.

BRAKE-OPERATING MEANS FOR TRAILERS.

1,336,235.  Specification of Letters Patent.  Patented Apr. 6, 1920.

Application filed May 23, 1918. Serial No. 236,108.

*To all whom it may concern:*

Be it known that I, HERBERT C. JARVIS, a citizen of the United States, and resident of Renton, King county, State of Washington, have invented certain new and useful Improvements in Brake-Operating Means for Trailers, of which the following is a specification.

My invention relates to the means employed for operating trailers which are attached to and drawn by trucks. It comprises certain novel constructions by which flexibility and easy adjustment are secured and by which undue strains are prevented.

The object of my invention is to provide a means for operating a brake upon a trailer of this kind such that it may be easily adjusted for different positions of the trailers relative to the truck, and such that the variations in the relative position of truck and trailer due to passing about curves, inequality of roads over which the apparatus travels and variations in grade, will not seriously affect the brake operating mechanism.

In the accompanuying drawings I have shown my invention as applied to a truck and the manner of connecting with the brake on the trailer.

Figure 1 is a side view of a truck chassis showing the manner of mounting my device thereon.

Fig. 2 is also a side view showing the rear end of the truck, together with the trailer, and the manner of connecting the two.

Fig. 3 is a plan view of the truck chassis, showing the brake operating mechanisms.

My invention relates more particularly to the mechanism by which a brake mounted upon the trailer may be operated from the driver's seat upon the truck and not to the particular character of the brake employed upon the trailer. The kind of brake employed upon the trailer is immaterial, so long as the same may be operated through a chain, cable, rod, or like transmission member. I have, therefore, illustrated a band brake 51 which has one end secured to a pin 52 carried by a frame member upon which pin a lever 54 is pivoted. The brake band passes about a hub 55 carried by the wheel and has its other end secured to the lever 54 outwardly from its pivot. The brake operating chain or cable 50 is secured to this lever and the lever is drawn backward toward brake-releasing position by a spring 53. Any other type of brake which is suitable may be employed.

At a point convenient to the driver of the truck is mounted a drum 1 and means whereby this drum may be manually operated and controlled. The type of means employed for this is, to a considerable extent, immaterial. The drum actuating means should be of a type which will permit rotation of the drum to permit storage of variable amounts of the transmission cable thereon and which is capable of acting upon the drum to apply the brake at any point to which the drum may have been turned. The means herein shown consists of a lever 10 which is pivoted upon the same axis as the drum 1, and is provided with a dog or pawl 11 which engages with the ratchet or toothed wheel 12, which is connected with or secured to the drum 1. A holding pawl or dog 13 is employed, which has connected therewith a kick-off or release lever 14, through means of a link 15.

Journaled upon the chassis at some point rearward of the operator's position and forward of the point where the pivotal draft connection is made between the trailer and the truck, is a shaft 2. This shaft extends transversely of the truck and has a drum 3 secured to an end thereof and in alinement with the drum 1. For convenience, these drums are mounted at the side of the truck chassis. The two drums are connected by a wire transmission cable 20, a chain, or any suitable like means, so that when the drum 1 is turned it will also turn the drum 3.

This transmission connection between the two drums 1 and 2 must be of such character that rotation may be given to these drums sufficient in amount to secure the paying out or taking up of the cable which extends from the truck to the trailer, through which the brake is operated. If a cable is employed it should have enough surplus length and the drums have sufficient storage capacity, to accommodate between a close hitch and a distant hitch of the trailer to the truck. At times it is necessary to hitch the trailer close up to the truck and at other times to hitch it a long way back. The brake operating mechanism must therefore have sufficient storage capacity for the connecting cable, or other equivalent conductor, to take up or let out these conductors as desired.

A third drum 4 is journaled upon the shaft 2 on the center line of the truck. This is connected for turning with the shaft 2 through the means of resilient members, as the torsion springs 21. In this way the drum 4 is capable of turning to a limited extent, upon the shaft 2 and will, therefore, yield slightly, if sudden excessive strains are placed upon the cable or similar structure, 5, by which this third drum is connected with the brake. In practice I prefer to employ a wire cable winding directly upon the drum 4 and to lead this rearwardly through vertical and horizontal guide rollers 6, which rollers are placed substantially in alinement with the pivot axes, by which the trailer and the load are connected with the truck.

The bunk 25, which is carried by the truck and which carries one end of the load, is mounted so that it may have a pivoting movement upon the pin 7. The trailer 8 is connected with the truck through a reach 80, which is connected in any suitable manner with the truck. The manner commonly employed by me for this purpose is to employ a downwardly extending strut 9 carried by the chassis of the truck, to which the forward end of the reach is secured through a draft pin.

In doing this the actual pivot point of the connection between the chassis and the truck does not exactly conform in alinement with the king pin 7 upon which the bunk turns. In consequence of this, there is a certain amount of variation in the distance from a given point upon the chassis of the truck to the connection with the brake on the trailer. It is to accommodate this variation, as well as that due to unequal track surface, that the resilient transmission member, herein shown as a spring 21, is employed.

If the distance is shortened a little, these will take up the variation and still maintain tension to a satisfactory extent upon the brake, while if the distance lengthens, they will give without producing an undue strain upon the brake operating connection. I prefer to employ in the connection between the truck and the trailer, a section 50 of chain, as by doing so large adjustment in the length of this connection may be quickly and easily made by taking up or letting out a certain amount of the chain.

I have found that a brake constructed under the plan described will work very satisfactorily about curves and with variations in the grade and in the character of the surface over which the truck is operating. While the distance between the drum 4 and the connection with the brake on the trailer may vary somewhat, the springs employed will automatically adjust for this difference, thus maintaining a satisfactory tension on the brake without at any time making this excessive. The guide rollers 6, through which the transmission member from the truck to the trailer passes, should preferably be located close to an alinement with the pivotal connection between the trailer and the truck. To secure this exactly would be inconvenient, and the employment of the springs in the manner herein described, is intended to compensate for the inequalities which are brought into play by reason of this fact.

What I claim as my invention is:

1. A means carried by a truck for operating brakes on trailers comprising two drums journaled on the truck, one on the center line and the other at one side and means rotatively connecting said drums and containing a resiliently yielding member, a manually controlled brake actuating member located at a distance from said drums, a cable winding upon one drum and extending to the said brake actuating member and a cable winding upon the other drum and adapted to be connected with the brake on the trailer.

2. A means for operating a brake on a trailer comprising two drums journaled on the hauling truck, a resiliently yielding member rotatively connecting said drums, a third manually controlled drum on the truck, a cable connecting said latter drum with one of the two connected drums, and a cable extending from the other drum and adapted to be connected with the brake mechanism upon the trailer.

3. A means for operating a brake upon a trailer from the hauling truck, comprising a shaft journaled on the truck, a drum journaled on said shaft, a torsion spring rotatively connecting said shaft and drum, a cable winding upon said drum and adapted to be connected with the brake upon the trailer, guides for said cable alined with the pivot axis of the draft connection between the truck and the trailer, and means carried by the truck for rotatively controlling said shaft.

4. A trailer brake for trucks comprising three drums mounted upon the truck, a cable secured to wind upon and connecting two of said drums, means operatively connecting one of said drums with the third drum, and a cable secured to wind upon the said third drum and adapted to be connected with the brake of the trailer.

5. A brake mechanism comprising braking members mounted upon one vehicle, brake operating members mounted upon another vehicle and transmission means connecting said parts containing a power transmitting conductor, a member forming an element in said power transmission means and adapted to be adjusted to take up and pay out said conductor as may be necessary to accommodate for considerable variations in spacing between the two vehicles.

6. A means for operating a brake upon a hauled vehicle from a hauling vehicle comprising a power transmitting conductor connecting said vehicles, a drum upon which said conductor is wound and stored as may be required by variable spacing between the two vehicles, and a spring forming an element in the mechanism whereby said drum is turned.

7. A means for operating a brake upon a trailer comprising a shaft, a drum loose thereon, a brake actuating cable secured to wind and store upon said drum, a spring rotatively connecting the drum with said shaft, a manually operative mechanism carried by the truck and means for operatively connecting said manually operative mechanism with the said shaft.

8. A means for operating a brake upon a hauled vehicle from a hauling vehicle, comprising a power transmitting conductor connecting said vehicles, and a drum forming an element in the power transmitting mechanism upon which said transmitting conductor is wound and stored as may be necessary to accommodate wide differences in the spacing between the hauling and hauled vehicles.

9. The combination with a brake upon a hauled vehicle, a brake operating mechanism upon a hauling vehicle including therein a drum, a transmission means connecting said drum with the brake and including a flexible member adapted to wind and store upon said drum, and means to rotatively adjust said drum relative to the primary member of the brake operating mechanism, whereby the device may be adjusted for variable spacing between the hauling and the hauled vehicle.

Signed at Renton, Washington, this 6th day of May, 1918.

HERBERT C. JARVIS.